3,288,812
DIOL DERIVATIVE OF CYCLOOCTANE
Pierre Lafont, Sainte Foy-Les-Lyon, and Gilbert Vivant, Lyon, France, assignors to Rhone-Poulenc S.A., Paris, France, a French body corporate
No Drawing. Filed July 5, 1963, Ser. No. 293,165
Claims priority, application France, July 9, 1962, 903,378
1 Claim. (Cl. 260—345.9)

The present invention relates to diols and to the preparation thereof.

The new diol of this invention is 2,6-dihydroxy-9-oxabicyclo(3,3,1)nonane of the following formula:

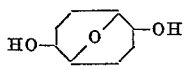

(I)

It is known to react mixtures of hydrogen peroxide and formic acid with alicyclic olefinic hydrocarbons. When the reaction is carried out with cyclooctene, there is obtained either 1,2-epoxycyclooctane, when 1.05 to 2 mols of hydrogen peroxide and less than 2 mols of formic acid are used per mol of hydrocarbon (see United States Patent No. 2,845,442), or the formates of 1,2- and 1,4-cyclooctanediols, when a large excess of formic acid is used [Cope et al., J. Amer. Chem. Soc., 74, 5884, (1952)]. Furthermore, it has also been possible to show that small quantities of trans-1,2-cyclooctanediol and cis-1,4-cyclooctanediol are obtained among the trans-annular products produced by the solvolysis of cis-cyclooctene oxide with a large molar excess of formic acid [Cope et al., J. Amer. Chem. Soc., 81, 1640, (1959)].

The same phenomena have been observed when cyclooctene is replaced by its higher homologue, cyclododecene, or by a polyenic alicyclic hydrocarbon such as cyclododecatriene, 1,2-epoxycyclododecane or 1,2-epoxycyclododecadi-5,9-ene and 1,2,5,6-diepoxycyclododec-9-ene are respectively obtained when the molar proportion of formic acid to hydrocarbon is smaller than or equal to 1:1, i.e. when the use of an excess of formic acid is avoided.

It has now surprisingly been found, that when cyclooctadi-1,5-ene is brought into contact with a molar excess of aqueous hydrogen peroxide in the presence of not more than a molar equivalent of formic acid, derivatives containing epoxide groups are not obtained, but instead 2,6-dihydroxy-9-oxabicyclo(3,3,1)nonane is directly obtained in excellent yield.

The present invention accordingly provides a process for the preparation of 2,6-dihydroxy-9-oxabicyclo(3,3,1)-nonane which comprises treating cyclooctadi-1,5-ene with aqueous hydrogen peroxide and formic acid at 0° to 100° C., more than 1 mol of hydrogen peroxide and not more than 1 mol of formic acid being used per mol of the diene. The reaction is preferably carried out at 50° to 70° C.

The proportion of hydrogen peroxide used is an excess over the cyclooctadi-1,5-ene employed. It is preferably between 2 and 5 mols per mol of cyclooctadi-1,5-ene. The hydrogen peroxide is in the form of an aqueous solution with a concentration between, for example, 20 and 70% by weight.

The quantity of formic acid used may be from 0.2 to 1 mol per mol of cyclooctadi-1,5-ene. Amounts of about 0.5 mol are particularly suitable.

In practice, the cyclooctadi-1,5-ene and the formic acid are mixed, at the temperature and in the proportions referred to above, and the aqueous solution of hydrogen peroxide is then added in portions. The homogeneous reaction mass which is obtained once the absorption of the peroxide has ceased is then worked up in conventional manner for isolation of the desired diol, e.g. it may be either concentrated in vacuo, or salted out by mixing the reaction product with a saturated aqueous solution of sodium chloride. The resulting crystalline mass is then recrystallized to obtain the pure product.

The new diol can be esterified with organic mono- or di-acids to give products which can be used as plasticisers for vinyl and cellulose polymers. It can also be polymerized with dicarboxylic acids in similar manner to known diols to give polyesters of high thermal stability.

The cyclooctadi-1,5-ene used as starting material in the process of the invention is readily obtainable, in good yield, either by selective hydrogenation of cyclooctatetraene [CRAIG et al. J. Amer. Chem. Soc., 75, 480, (1953)] or by dimerisation of butadiene (Agnew. Chem., 73, 33, (1961)].

The following example illustrates the invention.

EXAMPLE

In a 500-cc. three-necked flask, equipped with a stirrer device, a dropping funnel and a reflux condenser and maintained in a bath controlled at 50° C., there are placed 108 g. (1 mol) of cyclooctadi-1,5-ene, 23 g. (0.5 mol) of 98% by weight formic acid, and 135 g. of 32.8% by weight aqueous hydrogen peroxide, and the reaction mass is kept at 50° C. while stirring. Two hours later, another batch of 135 g. of the aqueous hydrogen peroxide is introduced. After stirring the reaction mass for another 17 hours, a homogeneous mixture is obtained, and the stirring of this at 50° C. is continued for a further 3 hours. The quantity of absorbed hydrogen peroxide, determined by titration, is about 2.2 mols.

The reaction mass is then extracted with 3×100 cc. of benzene, and the extract is washed with aqueous sodium bicarbonate and water, dried over anhydrous sodium sulphate, and the solvent is then evaporated in vacuo. 0.9 g. of residue remain.

The mother liquor of the benzene extraction is treated with 0.2 g. of Adam's platinum to destroy the excess hydrogen peroxide and then after filtration, is concentrated by evaporation under reduced pressure (15 to 20 mm. Hg). 130 g. of a crude product crystallises and is then recrystallised from methylethylketone to give 118 g. of a compound having the following characteristics: M.P. 80° C.; B.P./0.2 mm. Hg=144–145° C.; empirical formula, $C_8H_{14}O_3$; containing two non-vicinal hydroxyl groups (determined by acetylation; no reaction with periodic acid); and having a diacetate melting at 100–101° C. and a ditosylate melting at 123–126° C. The foregoing data, and also the analysis of the product by infra-red spectrography and by nuclear magnetic resonance, enable the product to be identified as 2,6-dihydroxy-9-oxacyclo(3,3,1)nonane.

The concentration in vacuo of the mother liquor can be replaced by salting out with a saturated solution of sodium chloride. It is then sufficient to filter the reaction mass and to recrystallise the residue as described above to obtain the diol melting at 80° C.

We claim:

2,6-dihydroxy-9-oxabicyclo(3,3,31)nonane of the formula:

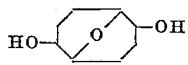

References Cited by the Examiner

UNITED STATES PATENTS

| | | | |
|---|---|---|---|
| 2,500,599 | 3/1950 | Bergsteinsson et al. | 260—635 |
| 2,555,927 | 6/1951 | Himel | 260—635 |
| 2,813,910 | 11/1957 | Tjepkema | 260—635 |

FOREIGN PATENTS

1,135,454  8/1962  Germany.

WALTER A. MODANCE, *Primary Examiner.*

N. S. MILESTONE, *Assistant Examiner.*